United States Patent Office.

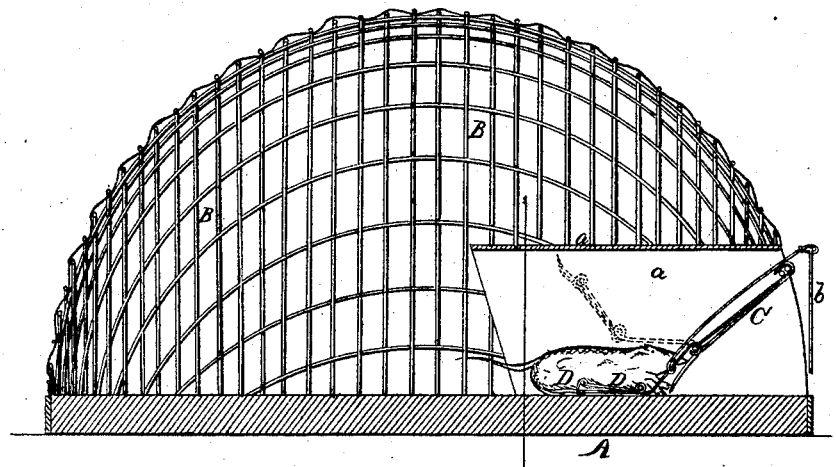
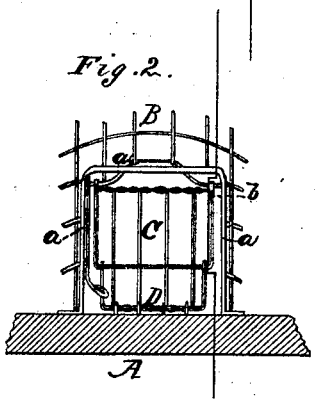

HERMAN BELMER, OF CINCINNATI, OHIO.

*Letters Patent No. 67,709, dated August 13, 1867.*

---

IMPROVEMENT IN ANIMAL TRAPS.

---

The Schedule referred to in these Letters Patent and making part of the same.

---

TO ALL WHOM IT MAY CONCERN:

Be it known that I, HERMAN BELMER, of Cincinnati, in the county of Hamilton, and State of Ohio, have invented a new and improved Animal Trap; and I do hereby declare that the following is a full, clear, and exact description thereof, which will enable others skilled in the art to make and use the same, reference being had to the accompanying drawings, forming part of this specification, in which—

Figure 1 is a vertical sectional view of my improved trap.

Figure 2, a detail sectional view taken on the line $x\,x$, fig. 1.

Similar letters of reference indicate like parts.

This invention relates to a trap that is stamped or pressed of wire cloth, with a wooden or other bottom, and which has but one entrance or opening. The door to this opening is so constructed that a rat or other animal can easily open it from the outside, and so get into the trap; but when once in the trap, it will be almost impossible for the captured animal to open the door from the inside.

Heretofore, traps of the class and shape to which mine belong were made of wire, wound spirally around heavier wire standards that were firmly secured in the bottom of the trap, and the spiral wire was secured to the said standards at every crossing by means of very fine wire thread. These traps generally had two or more entrances, one from the top and one or more at the sides; the latter, as well as some folding door in the bottom of the trap, acting as doors for letting the rats or other animals out. The doors in the sides were simply made of wire, hinged to the top of the entrance, and hanging down, so as to lie obliquely on the bottom of the trap. These traps did not very well answer the purposes for which they were intended, as especially sly old rats succeeded in raising the doors or in spreading two threads of the spiral wire, and thus made their escape. To overcome these difficulties my invention is intended.

A represents a circular or otherwise shaped wooden or other bottom, upon which a trap, B, made of wire gauze, and stamped or pressed into any suitable or desired shape, is placed and secured. An opening of suitable dimensions is left in one side of the trap, the sides of which are lined and the entrance covered with sheet metal or other material, forming a covered entrance, $a$. A door, C, is arranged in this entrance, and is made of wire rods, connected in suitable manner. The door is hinged at the upper part of the entrance in the usual manner, and hangs down obliquely into the inside of the trap, as usual. A second door, D, is hinged to the lower part of the door C, and lies flat on the floor of the trap when the doors are closed.

When a rat or other animal tries to get into the trap it has only to raise the door C, and, with it, the door D. The lower ends of the wires forming the door C are pointed, so as to prevent escape when the door is once raised. When a rat tries to raise the door C from the inside it will have to stand upon the door D, as is shown in the drawing; but even should it raise the door D to get at the door C, the ends of the door D will strike against the casing of the entrance and thus dead-lock the door C, as is shown by red lines in fig. 1. A wire rod, $b$, is secured to the inner door D, and passes over a horizontal wire of the wire netting, so that by pulling on the rod $b$ the door D will be raised and brought horizontal against the ceiling of the entrance, and thus the door C is or may be opened for the purpose of tilting the captive out, &c.

Having thus described my invention, what I claim as new, and desire to secure by Letters Patent, is—

1. The doors C and D, when made as described, and when provided with a handle, $b$, all made as set forth.
2. The doors C and D in combination with the covered entrance, all made as set forth.

HERMAN BELMER.

Witnesses:
GEORGE FISHER,
G. C. BRANKAMP.